US009598037B2

(12) United States Patent
Neal et al.

(10) Patent No.: US 9,598,037 B2
(45) Date of Patent: Mar. 21, 2017

(54) SENSOR BASED OCCUPANT PROTECTION SYSTEM

(71) Applicant: GM GLOBAL TECHNOLOGY OPERATIONS LLC, Detroit, MI (US)

(72) Inventors: Mark O. Neal, Rochester, MI (US); Jenne-Tai Wang, Rochester, MI (US); Chin-Hsu Lin, Troy, MI (US); Ke Dong, Troy, MI (US); Dorel M. Sala, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 248 days.

(21) Appl. No.: 14/476,435

(22) Filed: Sep. 3, 2014

(65) Prior Publication Data

US 2016/0059813 A1    Mar. 3, 2016

(51) Int. Cl.
*B60R 22/00* (2006.01)
*B60R 21/015* (2006.01)
*B60W 40/08* (2012.01)
*B60R 21/01* (2006.01)

(52) U.S. Cl.
CPC .. *B60R 21/01516* (2014.10); *B60R 21/01546* (2014.10); *B60R 21/01554* (2014.10); *B60W 40/08* (2013.01); *B60R 2021/01211* (2013.01); *B60R 2021/01279* (2013.01)

(58) Field of Classification Search
CPC ..... B60R 21/01516; B60R 2021/01211; B60R 2021/01279; B60R 21/01546; B60R 21/01554; B60W 40/08

USPC .......................................................... 701/45
See application file for complete search history.

(56) References Cited

U.S. PATENT DOCUMENTS

| 6,240,352 | B1 * | 5/2001 | McCurdy | B60N 2/002 280/735 |
| 6,682,095 | B2 * | 1/2004 | Roychoudhury | B60R 21/01512 280/735 |
| 6,823,959 | B2 * | 11/2004 | Winkler | G06K 9/00362 180/271 |
| 8,606,465 | B2 * | 12/2013 | Wang | B60R 21/01 701/1 |
| 2003/0196495 | A1 * | 10/2003 | Saunders | G01G 19/4142 73/862.041 |
| 2007/0182140 | A1 * | 8/2007 | Baur | B60R 21/0152 280/735 |
| 2008/0228358 | A1 * | 9/2008 | Wang | B60R 21/01512 701/49 |
| 2010/0121535 | A1 * | 5/2010 | Wang | B60R 21/01 701/45 |

(Continued)

*Primary Examiner* — Muhammad Shafi
(74) *Attorney, Agent, or Firm* — John A. Miller; Miller IP Group, PLC

(57) ABSTRACT

A system and method for optimizing various vehicle safety systems, such as airbags and seat belt load tensioning limiters, for a particular occupant of a vehicle seat, such as the vehicle driver or passenger, based on the weight of the occupant and the fore-aft position of the seat. The method senses the mass of the occupant and the position of the seat and classifies the combination of the mass and position. The method then determines the optimized setting of the safety systems for that combination classification, and automatically sets the safety systems to that setting. The method can also determine the optimized setting of the safety systems based on whether the occupant is wearing a seat belt.

15 Claims, 4 Drawing Sheets

(56) References Cited

U.S. PATENT DOCUMENTS

2010/0121536 A1\* 5/2010 Wang ................. B60R 21/01
 701/45
2012/0053793 A1\* 3/2012 Sala .................. B60N 2/0244
 701/45

\* cited by examiner

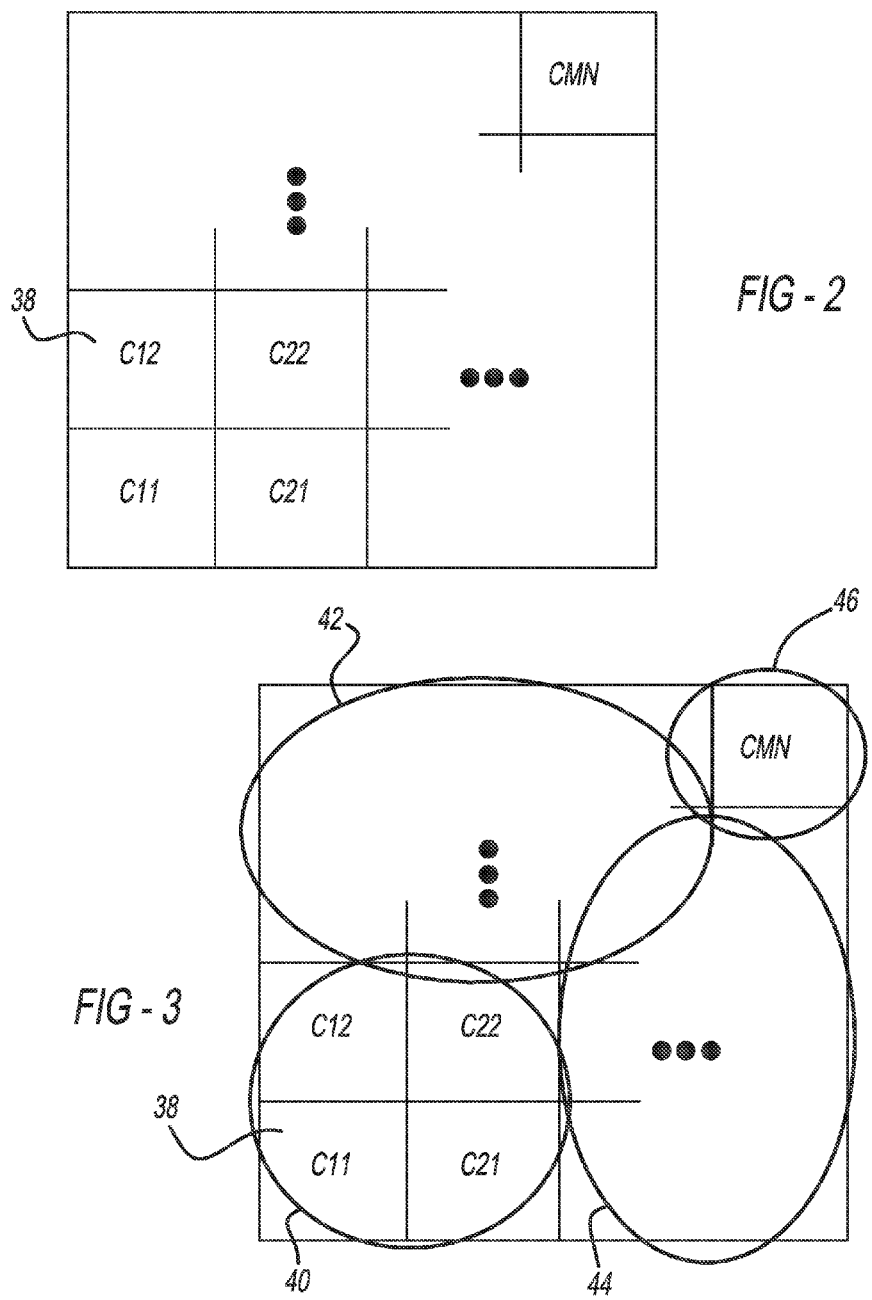

SENSOR BASED OCCUPANT PROTECTION SYSTEM

BACKGROUND OF THE INVENTION

Field of the Invention

This invention relates generally to a system and method for optimizing the performance of vehicle safety systems based on driver/passenger size and, more particularly, to a system and method for optimizing the performance of vehicle safety systems for a particular vehicle seat occupant, where the method sets the performance of the safety systems based on the fore-aft position of the vehicle seat and the weight of the occupant.

Discussion of the Related Art

Modern vehicles often include systems for automatically setting various components and features in the vehicle for a particular vehicle driver and/or passenger, many of which are based on the size of the driver and the personal preferences of the driver. Particularly, modern vehicles are generally designed to allow persons of varying sizes and preferences to adjust features of vehicle systems for each person's comfort, convenience and operational needs. These vehicle features can include vehicle seats, foot pedals, rear-view mirrors, steering columns, etc. To reduce the burden of readjusting the selected features of a vehicle, some vehicles employ a memory system that stores the preferred settings for one or more users that is configured to automatically adjust the vehicle systems to the preferred settings upon request.

Modern vehicles also include a number of safety devices and systems that protect the vehicle occupants during a crash event, such as airbag systems and seat belt systems. Vehicle airbag systems are complex systems that are designed to protect the vehicle occupants. For example, airbag systems need to be designed so that they are not activated unless the crash event is significant enough, they are not activated unless the crash event is from the proper direction, the airbag is deployed fast enough during the crash event, the airbag is filled with enough gas to protect the vehicle occupant during the crash event and the airbag is properly vented so that the gas can escape from the airbag with the proper flow rate when the vehicle occupant is forced against the airbag so as to dissipate the kinetic energy of the occupant without causing high rebound speed.

Vehicle seat belt systems may be equipped with a load-limiter that limits the load on the seat belt so that it provides proper restraint forces to safely protect the belted occupant in a crash event. Particularly, during a crash event where the seat belt wearer may be forced into the seat belt with high inertia force, the load-limiter allows the seat belt to extend or give a certain amount so that the seat belt force during the event is high enough to provide the needed restraint, but not to cause injury to the wearer.

Typically, the airbag filling and venting rate, the seat belt load-limiter tension and other safety features in the vehicle are set for an "average" person and may not be optimized for persons of lower weights and sizes and persons of higher weights and sizes. Therefore, it would be ideal to provide a system and method that automatically personalizes the driver safety features on a vehicle for different individuals.

Currently it is known in the art to set certain vehicle safety systems based solely on the weight of the occupant of a seat. Further, it is also currently known in the art to set certain vehicle safety systems based solely on the fore-aft position of the seat.

SUMMARY OF THE INVENTION

The present disclosure describes a system and method for optimizing various vehicle safety systems, such as airbags and seat belt load tensioning limiters, for a particular occupant of a vehicle seat, such as the vehicle driver or passenger, based on the weight of the occupant and the fore-aft position of the seat. The method senses the mass of the occupant and the position of the seat and classifies the combination of the mass and position. The method then determines the optimized setting of the safety systems for that combination classification, and automatically sets the safety systems to that setting. The method can also determine the optimized setting of the safety systems based on whether the occupant is wearing a seat belt.

Additional features of the present invention will become apparent from the following description and appended claims, taken in conjunction with the accompanying drawings.

BRIEF DESCRIPTION OF THE DRAWINGS

FIG. 2 is a graph with mass on the horizontal axis and seat position on the vertical axis showing a number of classifications for a combined seat occupant mass and fore-aft seat position;

FIG. 3 is the graph shown in FIG. 2 and including optimized safety system settings;

DETAILED DESCRIPTION OF THE EMBODIMENTS

The following discussion of the embodiments of the invention directed to a system and method for optimizing the position of vehicle safety systems based on the combined occupant mass and seat position is merely exemplary in nature, and is in no way intended to limit the invention or its applications or uses.

Figure 1:
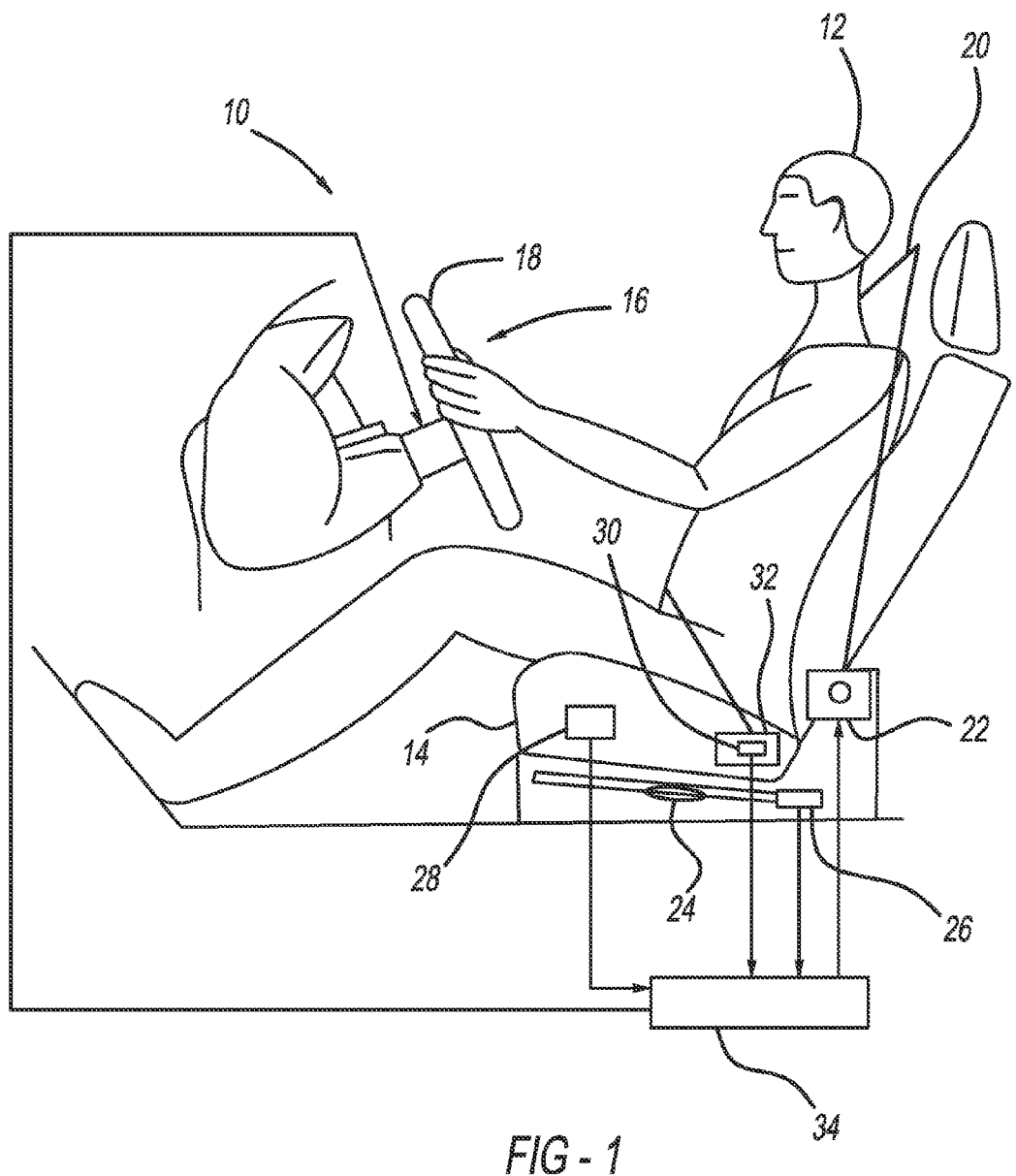
FIG. 1 is a side view illustration of a vehicle driver seated in a driver seat of a vehicle.
Figure 4:
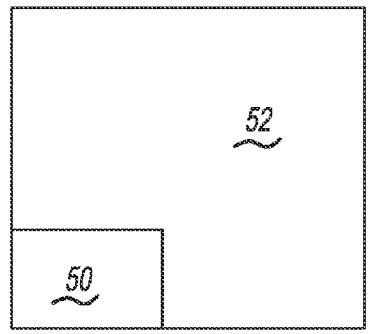
FIGS. 4-7 are graphs with mass on the horizontal axis and seat position on the vertical axis showing various embodiments for optimized safety system settings.
Figure 5:
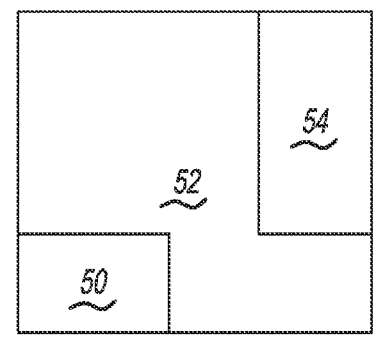
Figure 6:
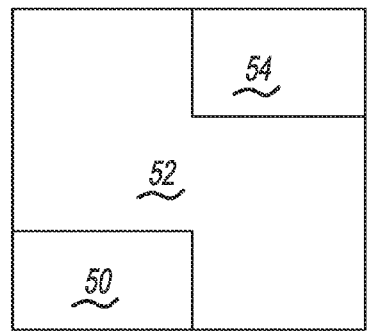
Figure 7:
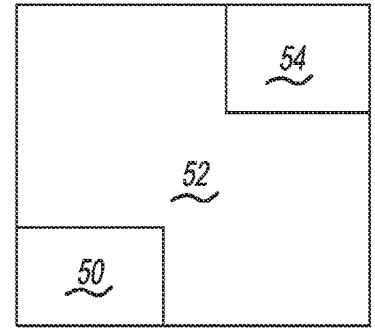

FIG. 1 is a side view illustration of the driver seat area of a vehicle 10 showing a driver 12 sitting in a driver's seat 14. The vehicle 10 includes a driver airbag system 16 typically mounted within a steering wheel 18 of the vehicle 10. The driver's seat 14 includes a seat belt 20 having a load-limiter 22 of the type discussed above, and a seat belt engagement sensor 30 provided in a seat belt buckle 32 to identify whether the seat belt 20 has been buckled. The seat belt buckle 32 is shown on the wrong side of the driver 12 merely for illustrative purposes. The vehicle seat 14 also includes a seat positioner 24, such as a suitable electric motor, that positions the seat 14 forward and backward in the seat area, where a seat position sensor 26 identifies the position of the seat 14. A mass sensor 28 in the seat 14 provides a measurement of the weight of the driver 12, where the mass sensor 28 can be any sensor suitable for the purposes described herein. A controller 34 receives sensor signals from the sensors 26, 28 and 30, and provides optimization setting signals to the airbag system 16 and the load-limiter 22 consistent with the discussion herein. It is noted that the representation of the driver seat area can also be a representation of a passenger seat area of the vehicle 10, where the passenger seat area includes the same components other than the steering wheel 18, and where the passenger side airbag is mounted in the dashboard of the vehicle 10. As such, the driver 12 will generally be referred to as the seat occupant below.

The present invention proposes a system and method for automatically optimizing the settings of various vehicle safety systems on the vehicle 10, such as the airbag system 16 and the load-limiter 22, to provide better system performance for a particular vehicle seat occupant in the event of a vehicle crash, such as the airbag deployment time delay between its first stage and second stage inflations, airbag vent size and seat belt load-limiter force level. Although only the airbag system 16 and the seat belt load-limiter 22 are specifically shown and described, it will be well understood by those skilled in the art that the system and method of the invention can be applicable to any vehicle safety system or device that can be optimized at different settings and positions that may be better for different sized seat occupants. One further example includes setting the position of the steering wheel 18 in the event of a vehicle crash.

As will be discussed in detail below, the method includes sensing the fore-aft position of the seat 14 and the mass of the driver 12 as a combined classification, determining what safety system optimization setting that classification is in, and then automatically setting the vehicle safety systems to that setting for that particular seat occupant. In one non-limiting embodiment, the method uses preferred or optimized safety system settings for three seat occupant sizes, namely, a fifth percentile female (F5), a fiftieth percentile male (M50) and a ninety-fifth percentile male (M95) as provided by statistical data collected by the National Health and Nutrition Examination Survey (NHANES).

FIG. 2 is a graph with seat occupant mass on the horizontal axis and fore-aft seat position on the vertical axis, where the occupant mass is arranged in columns and assigned a certain mass value 1, 2, . . . , M and the vehicle fore-aft seat position is arranged in rows and assigned a certain seat position value 1, 2, . . . , N so that each cross section of each column and each row identifies a classification box 38 defining a certain classification, such as C11, C12, C21, C22, . . . , CMN. The number of the classification boxes 38 would be application specific to different vehicles and systems.

FIG. 3 is an illustration of the graph shown in FIG. 2, where a collection of the classification boxes 38 are combined into groups and assigned a value that provides the optimized setting or position for the safety systems and devices that can be adjusted on the vehicle 10 for the seat occupants identified by those classifications. Generally, the settings for the safety systems are provided for three occupant body mass classes, i.e., small, medium and large, and three seating zones, i.e., fore, mid and aft. For example, area 40 identifies a group of classification boxes C11, C21, C12 and C22 for a lower occupant mass and closer seat position. For any classification falling within the area 40, the safety devices would be set for a fifth percentile female in this embodiment. Areas 42 and 44 identify a group of classifications for a lower occupant mass and a farther seat position, a higher occupant mass and a closer seat position, and a medium occupant mass and a medium seat position. For any classification falling within the areas 42 and 44, the safety devices would be set for a fiftieth percentile male in this embodiment. Likewise, area 46 identifies a group of classifications for a high occupant mass and a farther seat position, where the settings of the safety devices would be optimized for a ninety-fifth percentile male in this embodiment.

As discussed above, each combination of occupant mass and fore-aft seat position would be identified as a particular classification, where each classification identifies a particular setting for each of the safety systems associated with the vehicle 10. FIGS. 4-7 are illustrations of the graphs shown in FIGS. 2 and 3, where the settings are defined based on the specific classification areas in the graph. Thus, depending on the particular safety devices, the particular vehicle, whether it is the driver seat or the passenger seat being monitored, etc., the specific group setting can be adjusted for different combinations of occupant mass and seat position. In this embodiment, area 50 identifies the setting for the fifth percentile female, area 52 identifies the setting for the fiftieth percentile male, and area 54 identifies the setting for the ninety-fifth percentile male. In the example shown in FIG. 4, only two settings are employed.

One suitable technique for identifying the boundaries of the areas 50, 52 and 54 could be as follows. First, create a large number of crash simulation models with different occupant mass and occupant seat positions that span the range of all of the classification boxes 38. Next, perform three crash simulations for each of these occupants, where each simulation is for one of the safety system settings optimized for the fifth percentile female, the fiftieth percentile male and the ninety-fifth percentile male. Then use well known measures of injury probability to calculate an overall injury probability for each occupant for each safety system setting. If the boundaries of the classification boxes 38 are moved, some occupants will change their safety system settings, which in turn will change their injury probability. Thus, the safety systems can be optimized by adjusting the classification box boundaries in order to minimize the overall injury probability of all possible occupants.

Additionally, the group of classifications for a particular safety system setting can be modified based on whether the seat belt 20 is buckled as identified by the sensor 32. In other words, the safety systems and devices being automatically set depending on the mass of the occupant and the seat position may have a different optimization setting depending on whether the occupant is wearing the seat belt 20. Particularly, in this embodiment, the setting for a particular classification can be altered for two seat belt buckle statuses, i.e., belted and unbelted. Thus, the settings for the safety systems and devices can be provided separately for three occupant body mass classes, i.e., small, medium and large, and three seating zones, i.e., fore, mid and aft, and for whether the seat belt 20 is buckled or not.

Figure 8:
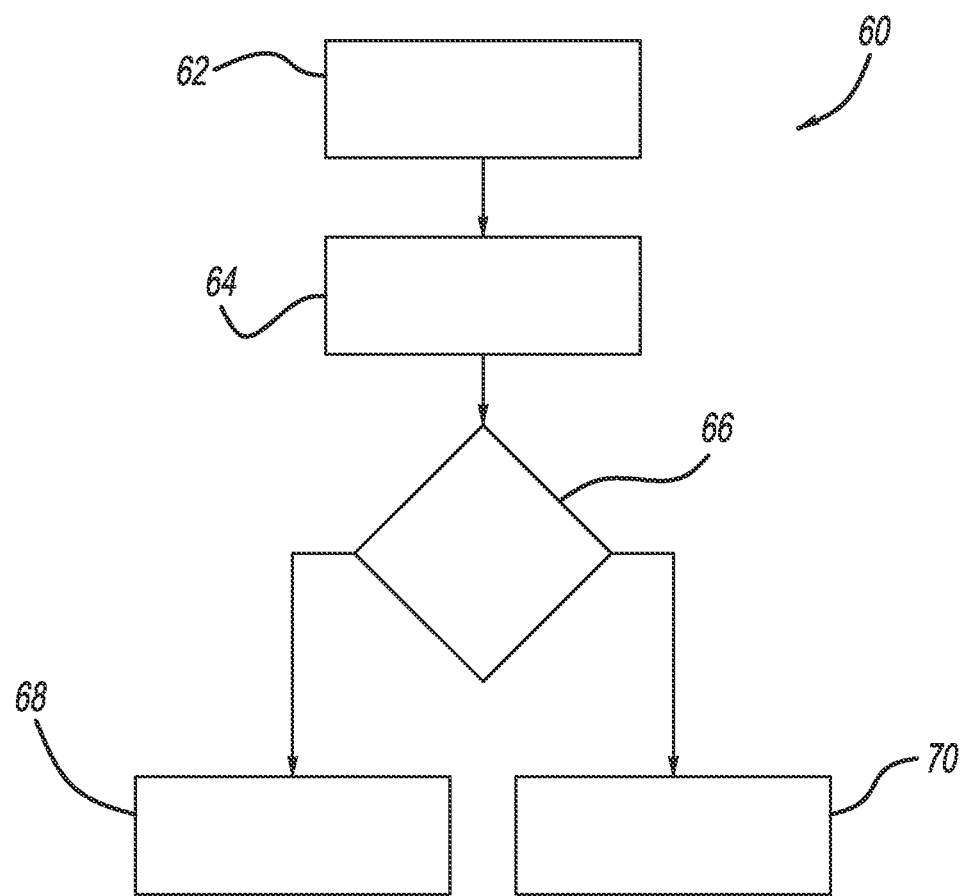
FIG. 8 is a flow chart diagram showing a process for optimized safety system settings for belted and unbelted occupants.

FIG. 8 is a flow chart diagram 60 showing a process for automatically optimizing the setting of the vehicle safety systems and devices, as discussed above. At box 62, the algorithm determines that the particular seat being monitored has been occupied. The algorithm then identifies the fore-aft seating zone of the seat and senses the body mass of the occupant at box 64. The algorithm then determines whether the seat belt 20 is buckled at decision diamond 66. If the occupant is belted at the decision diamond 66, then the algorithm uses the seating zone value and the body mass value to provide the optimized safety system setting for belted occupants to set the safety systems at box 68, and if the occupant is not belted at the decision diamond 66, then the algorithm uses the seating zone value and the body mass value to provide the optimized safety system setting for unbelted occupants to set the safety system settings at box 70.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for automatically optimizing settings for one or more safety systems on a vehicle for a particular occupant in a seat of the vehicle, said method comprising:
   determining, using a mass sensor, a mass of the occupant while seated in the seat;
   determining, using a seat position sensor, a fore-aft position of the seat;
   classifying, using a controller including a processor and memory, a combination of the mass of the occupant and the position of the seat, where the mass of the occupant is classified as small, medium or large, and the position of the seat is classified as fore, mid or aft, resulting in nine possible classification combinations;
   determining, using the controller, which of a plurality of safety system settings the classification combination falls in, where the classification combination is assigned to one of three safety system settings, and the safety system settings include small mass-fore seat, large mass-aft seat, and all-other; and
   setting the vehicle safety systems for that classification combination.

2. The method according to claim 1 further comprising determining whether a seat belt for the seat has been buckled, wherein determining the setting of the vehicle safety systems includes determining different settings for whether the occupant is wearing the seat belt or not.

3. The method according to claim 1 wherein determining which of a plurality of safety system settings the classification combination falls in includes identifying classification areas for each of the safety settings where the classification areas include a plurality of combinations of occupant mass and seat position.

4. The method according to claim 3 wherein boundaries of the classification areas are determined by creating a large number of crash simulation models with different occupant mass and occupant seat positions that span the range of all of the plurality of combinations of occupant mass and seat position, performing crash simulations for each of these occupants, where each simulation is for one of the safety system settings, and using known measures of injury probability to calculate an overall injury probability for each occupant for each safety system setting.

5. The method according to claim 1 wherein the three different system settings include settings for a fifth percentile female for the small mass-fore seat, a fiftieth percentile male for the all-other and a ninety-fifth percentile male for the large mass-aft seat.

6. The method according to claim 1 wherein the vehicle safety systems include vehicle airbag systems and vehicle seat belt load-limiters.

7. The method according to claim 1 wherein the seat is a driver seat or a passenger seat.

8. A method for automatically optimizing settings for one or more safety systems on a vehicle for a particular occupant in a seat of the vehicle, said method comprising:
   determining, using a mass sensor, a mass of the occupant while seated in the seat;
   determining, using a seat position sensor, a fore-aft position of the seat;
   classifying, using a controller including a processor and memory, a combination of the mass of the occupant and the position of the seat, where the mass of the occupant is classified as small, medium or large, and the position of the seat is classified as fore, mid or aft, resulting in nine possible classification combinations;
   determining, using the controller, which of a plurality of safety system settings the classification combination falls in, where the classification combination is assigned to one of three safety system settings, and the safety system settings include small mass-fore seat, large mass-aft seat, and all-other;
   determining, using a seat belt engagement sensor, whether a seat belt for the seat has been buckled; and
   setting the vehicle safety systems for that classification combination and whether the seat belt is buckled.

9. The method according to claim 8 wherein the three different safety system settings include settings for a fifth percentile female for the small mass-fore seat, a fiftieth percentile male for the all-other and a ninety-fifth percentile male for the large mass-aft seat.

10. The method according to claim 8 wherein the vehicle safety systems include vehicle airbag systems and vehicle seat belt load-limiters.

11. The method according to claim 8 wherein the seat is a driver seat or a passenger seat.

12. An optimization system for automatically optimizing settings for one or more safety systems on a vehicle for a particular occupant in a seat of the vehicle, said optimization system comprising:
   a mass sensor for determining a mass of the occupant while seated in the seat;
   a seat position sensor for determining a fore-aft position of the seat;
   a controller including a processor and memory, said controller including a first algorithm for classifying a combination of the mass of the occupant and the position of the seat, where the mass of the occupant is classified as small, medium or large, and the position of the seat is classified as fore, mid or aft, resulting in nine possible classification combinations;
   a second algorithm on the controller for determining which of a plurality of safety system settings the classification combination falls in, where the classification combination is assigned to one of three safety system settings, and the safety system settings include small mass-fore seat, large mass-aft seat, and all-other; and
   a communications path between the controller and the vehicle safety systems for setting the vehicle safety systems for that classification combination.

13. The optimization system according to claim 12 further comprising a seat belt engagement sensor for determining whether a seat belt for the seat has been buckled, wherein the second algorithm includes determining different settings for whether the occupant is wearing the seat belt or not.

14. The optimization system according to claim 12 wherein the three different system settings include settings for a fifth percentile female for the small mass-fore seat, a fiftieth percentile male for the all-other and a ninety-fifth percentile male for the large mass-aft seat.

15. The optimization system according to claim 12 wherein the vehicle safety systems include vehicle airbag systems and vehicle seat belt load-limiters.

\* \* \* \* \*